(12) United States Patent
Menn et al.

(10) Patent No.: US 12,742,541 B2
(45) Date of Patent: Sep. 22, 2026

(54) HEAT SINK FOR ELECTRONIC COMPONENT AND ASSOCIATED MANUFACTURING METHOD

(71) Applicant: VALEO VISION, Bobigny (FR)

(72) Inventors: Thibaut Menn, Angers (FR); Laurent Vivet, Bobigny (FR); Renan Leon, Le Mesnil Saint Denis Cedex (FR); Jean-Francois Bisson, Creteil (FR); Baptiste Decrouy, Bobigny (FR); Guillaume Bonvallat, Cergy Pontoise (FR)

(73) Assignee: VALEO VISION, Bobigny (FR)

( * ) Notice: Subject to any disclaimer, the term of this patent is extended or adjusted under 35 U.S.C. 154(b) by 69 days.

(21) Appl. No.: 18/551,736

(22) PCT Filed: Mar. 23, 2022

(86) PCT No.: PCT/EP2022/057715
§ 371 (c)(1),
(2) Date: Sep. 21, 2023

(87) PCT Pub. No.: WO2022/207435
PCT Pub. Date: Oct. 6, 2022

(65) Prior Publication Data

US 2024/0183524 A1 Jun. 6, 2024

(30) Foreign Application Priority Data

Mar. 29, 2021 (FR) ....................................... 2103227

(51) Int. Cl.
*F21V 29/76* (2015.01)
*B23K 26/0622* (2014.01)
(Continued)

(52) U.S. Cl.
CPC ........ *F21V 29/767* (2015.01); *B23K 26/0622* (2015.10); *B23K 26/3584* (2018.08);
(Continued)

(58) Field of Classification Search
CPC ..... F21Y 2115/10; F21S 41/143; F21S 43/14; F21S 45/48; F28F 13/185; B23K 26/3584; B23K 26/0622; F21V 29/89; F21V 29/767
(Continued)

(56) References Cited

U.S. PATENT DOCUMENTS 9,937,662 B2 * 4/2018 Kuczynski .......... B29C 48/0022
10,355,188 B2 * 7/2019 Ezaki ...................... C09K 5/14
(Continued)

FOREIGN PATENT DOCUMENTS

KR 10-2013-0096884 A 9/2013

OTHER PUBLICATIONS

International Search Report mailed on Jun. 30, 2022 in PCT/EP2022/057715 filed on Mar. 23, 2022 (2 pages).
(Continued)

*Primary Examiner* — Claire E Rojohn, III
(74) *Attorney, Agent, or Firm* — Oblon, McClelland, Maier & Neustadt, L.L.P.

(57) ABSTRACT

A heat sink for an electronic component and its manufacturing method by applying a nanopulsed laser. The heat sink includes a body provided with an outer layer, including a surface layer having a radiative exposed surface and a layer immediately underlying the surface layer. The underlying layer is made of a material based on a metal and the surface layer is made of an oxide of said material. The outer layer includes juxtaposed nodules. The heat sink originally combines a surface chemical state promoting heat emission and
(Continued)

a structure geometrically promoting heat exchange, in order to synergistically improve its heat dissipation capability.

13 Claims, 5 Drawing Sheets

(51) Int. Cl.
*B23K 26/352* (2014.01)
*F21S 41/143* (2018.01)
*F21S 43/14* (2018.01)
*F21S 45/48* (2018.01)
*F21V 29/89* (2015.01)
*F21Y 115/10* (2016.01)
*F28F 13/18* (2006.01)

(52) U.S. Cl.
CPC .............. *F21S 45/48* (2018.01); *F21V 29/89* (2015.01); *F28F 13/185* (2013.01); *F21S 41/143* (2018.01); *F21S 43/14* (2018.01); *F21Y 2115/10* (2016.08)

(58) Field of Classification Search
USPC .......................................................... 165/133
See application file for complete search history.

(56) References Cited

U.S. PATENT DOCUMENTS 10,707,388 B2 * 7/2020 Kunimune ........... H10H 20/852
11,658,094 B2 * 5/2023 Park .................... H10W 40/251 257/773
2008/0304535 A1 * 12/2008 Parriaux .............. G02B 5/0833 372/99
2009/0039525 A1 * 2/2009 Martin ................. B23K 1/0056 703/2
2009/0175005 A1 * 7/2009 Morelle .............. H10W 40/611 361/709
2009/0179336 A1 * 7/2009 Morelle ................ H10W 72/60 257/784
2011/0038124 A1 * 2/2011 Burnham .............. H10W 72/30 361/717
2012/0305916 A1 * 12/2012 Liu .................... G01R 1/07378 257/E23.151
2014/0116661 A1 * 5/2014 Xu ............................ F28F 3/00 29/890.03
2015/0007965 A1 * 1/2015 Joshi ..................... F28F 13/185 165/185
2018/0342478 A1 * 11/2018 Nakako ................... B22F 1/052
2019/0206761 A1 * 7/2019 Nomura ................. H05K 7/209
2020/0043835 A1 * 2/2020 Nomura .............. H10W 70/417
2020/0306888 A1 * 10/2020 Kobayashi ........... B23K 26/355
2021/0233871 A1 * 7/2021 Kaizu .................. B23K 35/264
2023/0287568 A1 * 9/2023 Kalita ............... C23C 16/45565
2024/0183524 A1 * 6/2024 Menn .................... F21V 29/767

OTHER PUBLICATIONS

Preliminary French Search Report dated Dec. 14, 2021 in French Application 2103227 filed on Mar. 29, 2021 (10 pages, with Translation of Categories).

* cited by examiner

HEAT SINK FOR ELECTRONIC COMPONENT AND ASSOCIATED MANUFACTURING METHOD

TECHNICAL FIELD

The present invention relates to the field of heat sinks. It is particularly advantageously applicable in the field of lighting and/or signaling for a motor vehicle, in particular for cooling light-emitting diodes.

PRIOR ART

Heat dissipation is a general problem when electronic components are operating, and in particular for light-emitting diodes, the circuits of which produce a significant amount of heat. This is notably the case in the field of automotive lighting.

Heat sinks are generally associated with electronic circuits and/or components to facilitate their cooling by natural convection.

There are several known solutions for increasing the heat exchange of the heat sinks by natural convection. Geometric approaches involve increasing the exchange surface of the heat sink with the ambient air. Typically, fins are added to the heat sink to this end. However, this increases the bulk of the heat sinks and requires specifically machining or molding them, making the manufacture thereof complex and thus increasing their cost.

It is also possible to seek to improve the radiative properties of the heat sink by chemically modifying its surface condition. To this end, the existing solutions involve treating the surface of the heat sink, for example, by cataphoresis, anodization, by physical vapor deposition or even by plasma-assisted deposition. A method is notably known from document US 2007/0210265 A1 for forming an amorphous carbon layer and a metal carbide layer on a heat sink by physical vapor deposition. However, these treatments remain expensive and complex to implement.

Therefore, an aim of the present invention is to propose an improved heat sink and an improved method for manufacturing a heat sink compared to the existing solutions.

The other aims, features and advantages of the present invention will become apparent upon reviewing the following description and the accompanying drawings. It is understood that other advantages can be incorporated.

SUMMARY

In order to achieve this aim, according to a first aspect, a heat sink is provided for an electronic component comprising a body provided with an outer layer. At least one portion of the outer layer comprises a surface layer having a radiative exposed surface and a layer immediately underlying the surface layer.

Advantageously:

- the underlying layer is made of a material based on or made of a metal or of a metal alloy and the surface layer is based on or made of an oxide of said material;
- the outer layer comprises juxtaposed nodules.

The radiative exposed surface is thus formed of a metal oxide, which allows the emissivity of the radiative surface to be increased in the visible and the infrared domain. Furthermore, the nodules form a microstructure of the outer layer inducing a significant increase in surface roughness, and therefore a significant increase in the radiative surface compared to the existing solutions. The heat sink originally combines a chemical surface condition promoting heat emission, and a structure geometrically promoting heat exchange, in order to synergistically improve its heat dissipation capability.

A second aspect of the invention relates to a method for manufacturing a heat sink for an electronic component, comprising:

- providing a body of a heat sink provided with an outer layer made of a material based on or made of a metal or a metal alloy and having a surface;
- treating at least a portion of the surface of the outer layer, comprising the application of a pulsed laser beam, wherein:
  - the duration of a pulse of the laser beam is substantially less than or equal to 100 ns;
  - the beam has a power density that is substantially greater than or equal to 100 $MW \cdot cm^{-2}$;
  - the beam is scanned over the portion of the surface of the surface layer with a coverage rate that is substantially greater than or equal to 60% between two distinct, preferably successive pulses.

The treatment thus allows the formation, from the outer layer of the body, of a surface layer having a radiative exposed surface and a layer immediately underlying the surface layer, with the underlying layer being made of a material based on or made of said metal or of said alloy and the surface layer being based on or made of an oxide of said material, the outer layer comprising juxtaposed nodules of oxide of said material.

It is therefore understood that the method allows the heat sink to be manufactured according to the first aspect of the invention and allows the associated advantages to be achieved. Indeed, this pulsed laser treatment, commonly called a nanopulsed laser, induces both the oxidation of the metal of the outer layer so as to form the surface layer, and the formation of the nodules. This treatment is also much cheaper and faster than the treatments by cataphoresis, anodization, by physical vapor deposition or by plasma-assisted deposition.

During this treatment, the body of the heat sink is heated very briefly when the laser beam is pulsed. The method only locally produces a very low increase in temperature, typically less than 10° C. Thus, the method can be implemented on a finished product, such as a printed circuit having a metal base, and/or a heat sink on which the electronic component is already mounted by heat conduction, without any risk for any components, glues, seals, and various elements made of plastic. Therefore, the method can comprise assembling the one or more electronic components, optionally a printed circuit, and the heat sink. This assembly can be carried out prior to the treatment by applying the pulsed laser. The part after treatment also does not need to be cooled, the method therefore can be devoid of a cooling step following the laser treatment. Moreover, this method does not require prior treatment of the treated surface, for example, cleaning, before and/or after the laser treatment.

A third aspect relates to a device comprising at least one electronic component mounted on the heat sink according to the first aspect by heat conduction.

According to several embodiments taken alone or in combination:

- the device comprises a printed circuit on which the electronic component is mounted, with the printed circuit comprising a base made of metal, preferably made of aluminum, forming the heat sink;
- the device comprises a printed circuit on which the electronic component is mounted, for example, a printed circuit comprising a plastic base, with the heat sink being mounted on the printed circuit by heat conduction;

the electronic component is a light-emitting diode;

the device is a lighting or signaling light device for a motor vehicle, notably a rear light of a vehicle, a lighting module of a headlight, or a headlight, notably comprising this lighting module.

BRIEF DESCRIPTION OF THE FIGURES

The aims, objects, features and advantages of the invention will become more clearly apparent from the detailed description of one embodiment of the invention, which embodiment is illustrated by the following accompanying drawings, in which.

Figure 1:
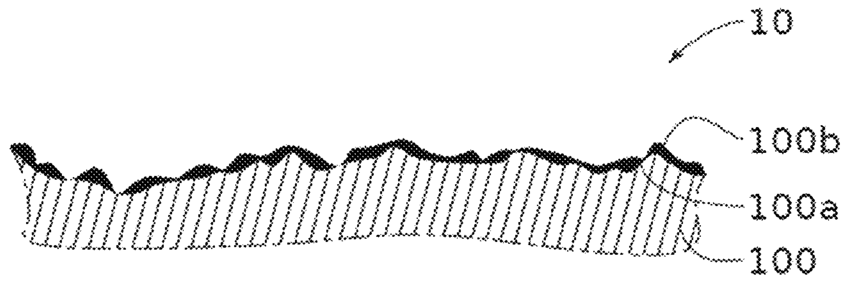
FIG. 1 shows a cross-sectional view of the upper layer of the body of the heat sink, before the pulsed laser treatment, according to one embodiment.

The drawings are provided by way of examples and by no means limit the invention. They are schematic conceptual depictions intended to facilitate the understanding of the invention and are not necessarily drawn to the scale of practical applications. In particular, the relative dimensions of the various layers and of the nodules do not necessarily represent the reality.

DETAILED DESCRIPTION

Before beginning a detailed review of embodiments of the invention, the optional features of the first aspect of the invention are set forth hereafter, which features optionally can be used in combination or alternatively:

the metal is selected from among magnesium, iron, aluminum, steel, copper and preferably aluminum;

the metal is aluminum and the oxide is alumina;

the surface layer has an average thickness that is greater than or equal to 5 μm; this allows the radiation to be optimized, particularly by increasing the radiation of the oxide layer relative to that of the metal; the Applicant has noticed that this thus improves the heat dissipation by the heat sink;

the surface layer has an average thickness substantially ranging between 5 μm and 30 μm; this allows, while retaining the aforementioned thermal properties, good coverage of the nodules and of the layer between the nodules to be provided, and also allows the mechanical properties of said body to be retained;

the surface layer has an average thickness substantially ranging between 5 μm and 15 μm;

the surface layer has an average thickness substantially ranging between 15 μm and 30 μm; this range is particularly optimal in terms of good coverage of the nodules, as well as in the inter-nodular zones, and thus offers better radiative properties of the surface, while retaining the mechanical and thermal properties of the rest of said body;

the surface layer has a porosity rate by volume of less than 4%; this allows better radiative properties by absorption and by emission to be provided, which properties are linked to its dielectric properties, thus improving the heat dissipation;

the shape of the nodules is generally cylindrical;

each nodule has a variable cross-sectional shape over the height of this nodule; in other words, the section of the nodule does not assume a constant shape over the entire height of the nodule; notably, the nodules may not assume any regular shapes from one to the next, even when they assume a generally cylindrical shape;

the nodules on average have:

a first dimension, and more specifically a diameter, in a direction substantially parallel to the main extension plane of the outer layer, that is substantially less than or equal to 50 μm, preferably substantially ranging between 10 μm and 30 μm, even more preferably substantially equal to 20 μm;

a second dimension, and more specifically a height, in a direction substantially normal to the main extension plane of the outer layer, that is substantially less than or equal to 50 μm, preferably substantially ranging between 20 μm and 40 μm, even more preferably substantially equal to 30 μm;

the nodules are spaced apart from each other by an average distance, in a direction parallel to the main extension plane of the outer layer, that is substantially less than or equal to 50 μm;

the nodules are formed from a combination of the surface layer and at least a portion of the underlying layer.

Optional features of the second aspect of the invention are set forth hereafter, which optionally can be used in combination or alternatively:

the duration of the laser pulses is less than 20 ns;

the coverage rate is substantially greater than or equal to 75%;

the laser beam has a depth of field that is substantially equal to 3 mm;

when the laser beam is pulsed, the impact zone of the laser beam on the surface of the outer layer has a larger lateral dimension, for example, a diameter, selected over a range of values ranging from a few tens of μm to several cm, preferably from a few tens of μm to several hundred μm, as a function of the size of the zone to be treated;

when the laser beam is pulsed, the impact zone of the laser beam on the surface of the outer layer has a larger lateral dimension, for example, a diameter, that is substantially less than or equal to 500 μm, preferably equal to 400 μm, even more preferably equal to 100 μm;

- when the laser beam is pulsed, the impact zone of the laser beam on the surface of the outer layer is circular or rectangular;
- the surface of the outer layer has a maximum roughness Rz that is substantially less than or equal to 20 μm, preferably substantially less than or equal to 15 μm, preferably substantially less than or equal to 5 μm, preferably substantially equal to 3 □m, prior to the treatment;
- the wavelength of the laser beam belongs to a domain selected from among the infrared domain, for example, the wavelength ranges between 780 nm and 0.1 mm, the visible domain, for example, the wavelength ranges between 380 nm and 780 nm, and the ultraviolet domain, for example, the wavelength ranges between 100 nm and 380 nm;
- the pulsed laser treatment can be carried out in ambient air, or even in the presence of an oxidizing atmosphere comprising an oxidizing gas, for example, dioxygen at a proportion that is substantially greater than 20%.

It should be noted that, within the scope of the present invention, expressions such as "equal to, less than, greater than" are understood to mean comparisons that can accommodate certain tolerances, notably according to the scale of magnitude of the compared values and the measurement uncertainties. Similarly, the expression "ranging between" denotes a range of values that can accommodate certain tolerances, notably according to the scale of magnitude of the values of the range and the measurement uncertainties. Substantially equal, lower or higher values are included in the scope of understanding of the invention.

A parameter that is "substantially equal to/greater than/less than" a given value is understood to mean that this parameter is equal to/greater than/less than the given value, plus or minus 10%, close to this value. A parameter that "substantially ranges between" two given values is understood to mean that this parameter is at least equal to the smallest given value, plus or minus 10%, close to this value, and at most equal to the largest given value, plus or minus 10%, close to this value.

The term "on" does not necessarily mean "directly on". Thus, when a part or an element A is indicated as being in abutment "on" a single part or an element B, this does not mean that the parts or elements A and B are necessarily in direct contact with the other. These parts or elements A and B can be either in direct contact or in abutment on one another by means of one or more other parts.

An element based on a material A is understood to mean an element comprising this material A and optionally other materials.

Throughout the following description, the layer thicknesses or the heights of an element are generally measured in directions perpendicular to the plane of the upper face of the body on which the layer is arranged. Thus, the thicknesses are generally taken in a vertical direction on the cross-sectional views that are shown. In the case of a three-dimensional element, for example, a nodule, the thickness of a layer extending over a flank of this element can be measured perpendicular to this flank.

The term "average" dimension of an element such as a layer or a nodule is understood to mean that this dimension is averaged over a sufficient surface or over a sufficient number of nodules to acquire a sufficient statistical sample. Preferably, the average thickness of a layer is averaged over an area at least substantially equal to 0.20 $mm^2$, preferably at least substantially equal to 0.25 $mm^2$, for example, over a square area with 500 μm sides.

The heat sink 1, and its manufacturing method will now be described with reference to FIGS. 1 to 3.

In the manufacturing method, the body 10 of the heat sink 1 is provided. This body is provided with an outer layer 100 made of a material based on or made of a metal, or of a metal alloy, as illustrated, for example, in FIG. 1. The exterior of the body 10 can be entirely formed by this outer layer 100. As a non-limiting example, hereafter the body 10 is considered to be entirely formed of this outer layer 100, and made of a metal. The outer layer has a surface 100*a* that will be at least partially treated by applying a pulsed laser beam, hereafter referred to as laser treatment, i.e., the surface 100*a* is intermittently subjected to laser radiation by at least a plurality of high-power density laser pulses, described in further detail hereafter.

According to the example illustrated in FIG. 1, before the laser treatment, the surface can be relatively smooth. Typically, the surface 100*a* of the outer layer 100 has a maximum roughness Rz that is substantially less than or equal to 20 μm, preferably substantially less than or equal to 15 μm, more preferably substantially less than or equal to 5 μm, preferably substantially equal to 3 μm.

The laser treatment induces spraying of the outer layer 100, inducing the oxidation of the metal of the body and microstructuring of the surface 100*a*. Thus, and as illustrated, for example, by FIGS. 2 and 3, a surface layer 101 is formed on the surface that is based on or made of a metal oxide, or of a metal alloy, directly surmounting an underlying layer 102 based on or made of the metal or metal alloy. This chemical modification is carried out without having to deposit an additional layer, which is generally acquired by complex and expensive methods.

Figure 2:
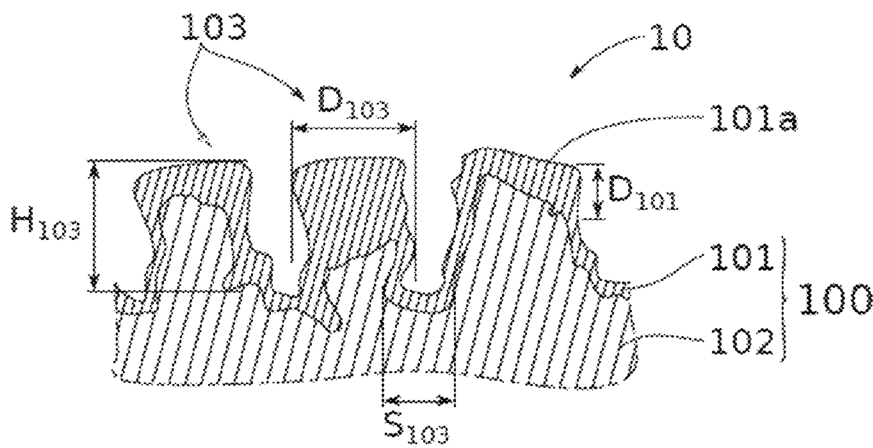
FIG. 2 shows a cross-sectional view of the upper layer of the body of the heat sink, acquired after the pulsed laser treatment, according to one embodiment.

A topographic transformation of the surface 100*a* is also induced, in order to arrive at the surface 101*a*, for example, illustrated in FIG. 2. During the development of the invention, it has actually been found that nodules 103 were formed on the surface of the body 10.

Therefore, the method combines deep texturing of the metal surfaces, typically over several tens of μm, and photochemistry-induced oxidation. Oxidation induces an increase in the emissivity properties of the body 10 of the heat sink, notably in the visible domain and in the infrared domain. The formation of the nodules increases the roughness of the surface 101*a* relative to that of the surface 100*a*, and therefore very significantly increases the radiative surface of the body 10. Thus, the body of the heat sink has an increased dissipating capability, in order to approach the emission properties of a black body.

Before the laser treatment, the surface 100*a* also can be covered with residual compounds 100*b*, such as organic residues and/or metal debris, as illustrated in FIG. 1. These residual compounds typically originate from the various operations that the body 10 of the heat sink has undergone when it is manufactured, such as by molding and/or machining. These residual compounds will be sprayed during the laser treatment. The method thus can be devoid of a step of cleaning the surface of the outer layer prior to and/or following its pulsed laser treatment. This represents a significant advantage compared to the techniques of depositing a radiative layer on the surface of the body 10, which require the best possible surface condition in order to be reproducible.

The structuring of the outer layer 100 after laser treatment will now be described in further detail with reference to FIGS. 2 and 3. The nodules 103 are preferably homogeneously distributed over the surface 101*a*, i.e., their number per unit area is substantially identical in any portion of the same determined size of the surface 101*a* of the body, and more specifically for a size large enough to observe a sufficient statistical sample.

Figure 3:
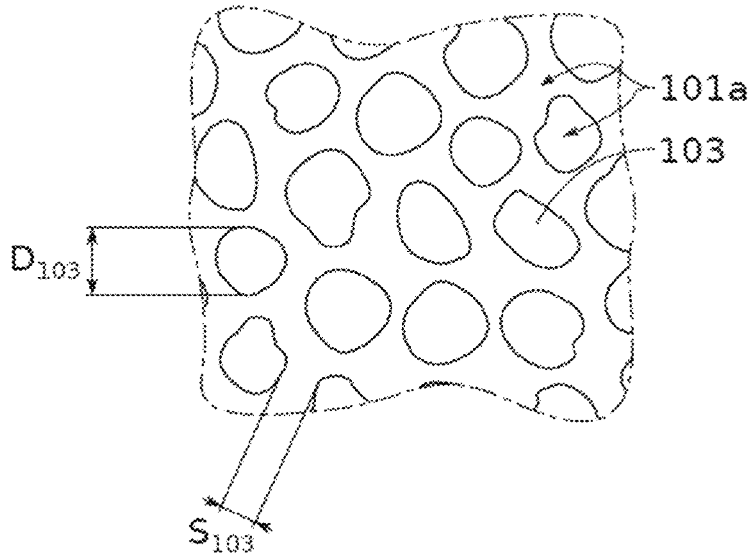
FIG. 3 shows a top view of the upper layer of the body of the heat sink, acquired after the pulsed laser treatment, according to the example illustrated in FIG. 2.

The nodules 103 can assume a generally cylindrical shape, as illustrated by the top view illustrated in FIG. 3. The term "globally circular" is understood to mean that each nodule 103 is inscribed in a cylinder defined from the top of the nodule 103. The section of the nodule 103 is not necessarily circular, as shown in FIG. 3. The section of the nodule 103 also does not necessarily assume a constant shape over the entire height of the nodule 103, as shown in FIG. 2. The overall cylindrical shape can have a central axis substantially perpendicular to the main extension plane of the outer layer 100. With the laser treatment structuring the outer layer 100 over a depth ranging up to several tens of μm, the size of the nodules 103 is more specifically micrometric.

Thus, as in the illustrated example, each nodule 103 can have a variable cross-sectional shape over the height of this nodule 103. In particular, the nodules 103 have no regular shapes from one to the next, even if they are generally cylindrical. In general, this nodule structure can be more specifically acquired with the method according to the present invention, unlike conventional ablation or machining methods.

As illustrated in FIG. 2, they can have an average diameter $D_{103}$ that is substantially less than or equal to 50 μm, preferably substantially ranging between 10 μm and 30 μm, even more preferably substantially equal to 20 μm. They also can have an average height $H_{103}$ that is substantially less than or equal to 50 μm, preferably substantially ranging between 20 μm and 40 μm, even more preferably substantially equal to 30 μm. According to one example, the nodules 103 are juxtaposed by being separated by an inter-nodular zone. The nodules thus can be spaced apart by an average distance $S_{103}$, in a direction parallel to the main extension plane of the outer layer 100, that is substantially less than or equal to 50 μm, preferably to 20 μm, and more preferably substantially equal to 10 μm. It has been observed that these geometries allowed the radiative surface 101*a* to be increased approximately six-fold compared to an untreated surface 100*a*.

Depending on the thickness of the surface layer 101 of oxide, in light of the examples of structures described above, it is understood that the nodules 103 can be formed solely by the surface layer 101 of oxide, or by a combination of the surface layer 101 and of at least a portion of the underlying layer 102, as illustrated in FIG. 2.

The average thickness of the surface layer 101 of oxide can be substantially less than 30 μm, and preferably can substantially range between 15 μm and 30 μm. This thickness ensures good coverage of the nodules 103 and in the inter-nodular zones, and therefore ensures better radiative properties of the surface 101*a*, while retaining the mechanical and thermal properties of the remainder of the body 10.

In a non-exhaustive manner, the metal of the body 10 can be selected from among magnesium, iron, steel, copper and aluminum. Preferably, the metal is aluminum and the oxide formed during the laser treatment is alumina. Aluminum is an excellent heat conductor and can be easily worked on at a low temperature and can be deformed without breaking, which in fact makes it an excellent material for forming heat sinks of various shapes. Furthermore, alumina is nine times more thermally radiative than aluminum. The radiative properties of the surface layer 101, and notably of the radiative surface 101*a*, are further improved.

Therefore, the heat sink 1 is particularly advantageous for cooling an electronic component and/or a printed circuit. Several examples of devices will now be described with reference to FIG. 4.

Figure 4:
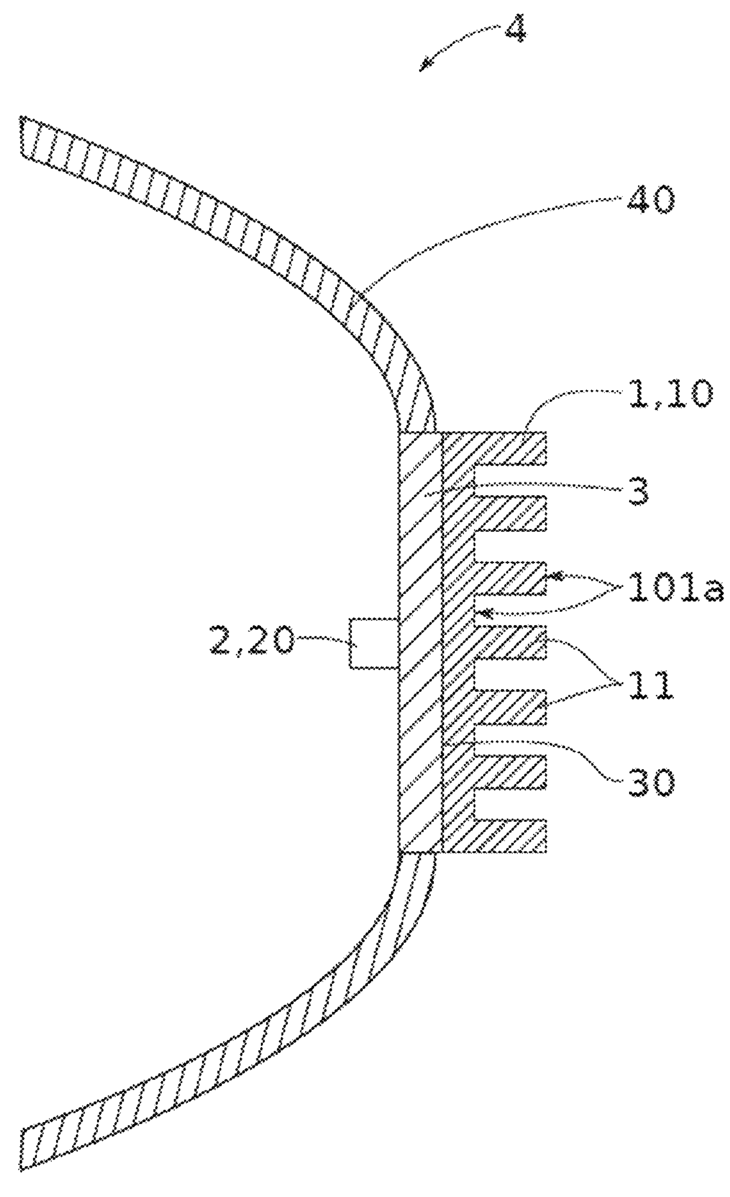
FIG. 4 shows an overall view of a device comprising the heat sink, according to one embodiment.

The device 4 comprises at least one electronic component 2 mounted on the heat sink 1 by heat conduction. To this end, the electronic component 2 can be mounted on a printed circuit 3. The printed circuit 3 can be mounted on the heat sink 1 by heat conduction. To this end, the printed circuit 3 can be mounted on the heat sink via a thermal interface 30, such as a thermal glue, as illustrated in FIG. 4. This example more specifically applies for plastic-based printed circuits, for example, made of epoxy resin and/or polyimide. According to another example, not illustrated, the printed circuit 3 on which the electronic component 2 is mounted comprises a metal base, and is preferably made of aluminum, forming the heat sink 1. The heat sink 1 can further comprise cooling fins 11, the emissive surface 101*a* of which can have the aforementioned features.

The radiative surface 101*a* of the heat sink can be arranged on a face of the body 10 distinct from a face on which the electronic component 2 and/or the printed circuit 3 is mounted, preferably an opposite face, as illustrated in FIG. 4, for example.

The electronic component 2 can be a light source, for at least one function selected from among a lighting function and a signaling function, and more specifically for motor vehicles. To this end, the source can be a light-emitting diode 20 (abbreviated to LED hereafter). For automotive applications, high-power LEDs are generally used. Most of the energy of an LED is converted to heat as opposed to light. If this heat cannot be dissipated, the efficiency of the LED is reduced and its lifetime is shortened.

Therefore, the heat sink 1 is particularly advantageous for applications in a lighting or signaling light device 4 of a motor vehicle. To this end, the device 4 can include a reflector 40, on which an LED 20 is mounted, which itself is mounted on the heat sink 1 by heat conduction.

Figure 5A:
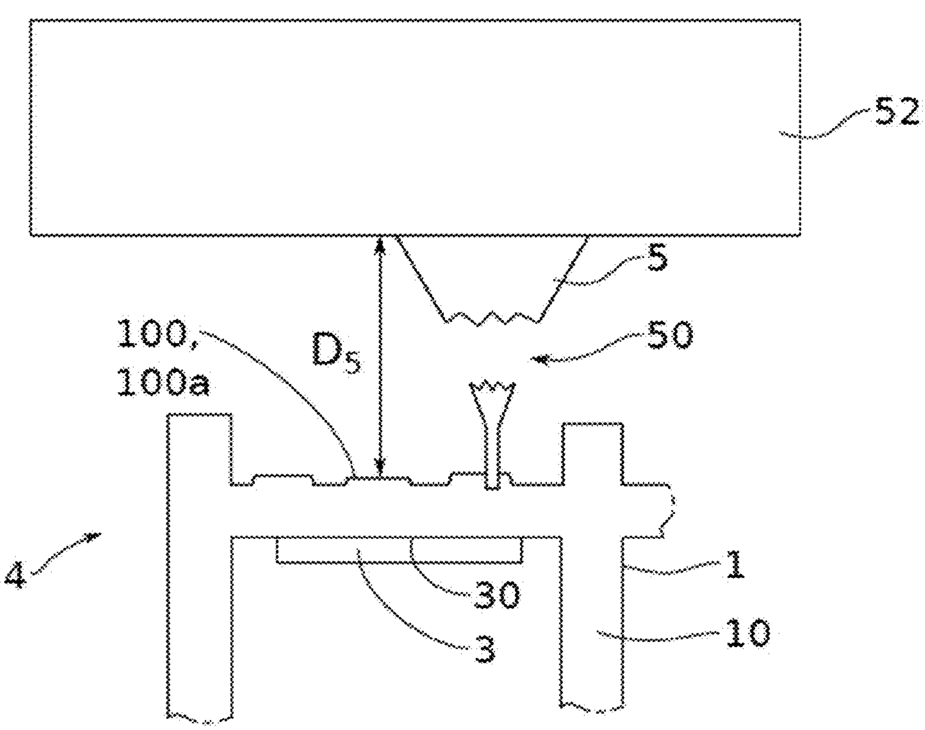
FIGS. 5A shows a schematic view of the pulsed laser treatment.
Figure 5B:
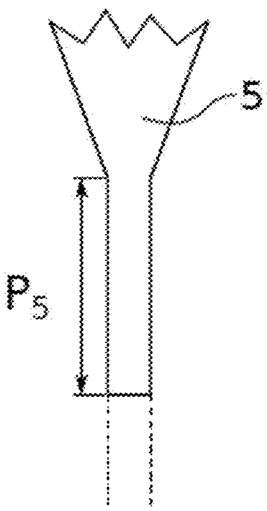
FIG. 5B shows a schematic view of the pulsed laser treatment.
Figure 6:
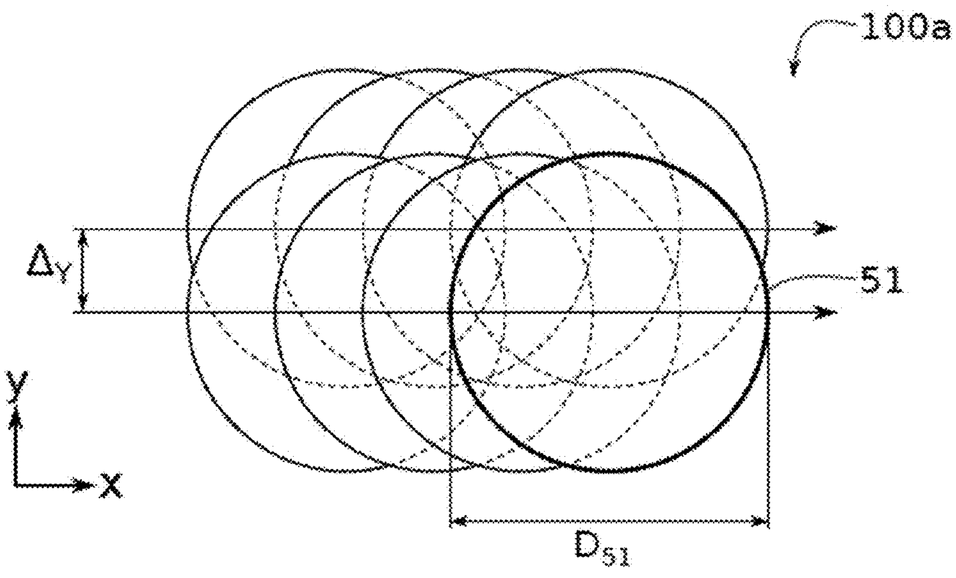
FIG. 6 shows a schematic view of the impact zones of the laser on the surface of the body of the heat sink, according to one embodiment.

The features of the method for manufacturing the heat sink will now be described with reference to FIGS. 5 and 6. In order to acquire the oxidation of the surface layer 102 and the nodule formation 103, the laser treatment uses a pulsed laser generating pulses with a duration of less than 100 ns. The power density is at least 100 $MW \cdot cm^{-2}$. Furthermore, the laser beam 5 is scanned on the surface 100*a* of the body with a coverage rate between the distinct pulse impact zones that is substantially greater than or equal to 60%. During the development of the invention, it has been surprisingly discovered that this set of parameters allowed the previously described structure to be achieved.

Since the laser pulses are high-power density pulses but last for a very short duration, the laser treatment generates very low heat build-up of the body 10 of the heat sink, typically less than 10° C. Therefore, the laser treatment can be applied to a finished product, for example, on a device 4 comprising the heat sink 1 and a printed circuit 3 and/or an electronic component 2 mounted on the heat sink 1. Therefore, the method can include assembling the printed circuit 3 and/or an electronic component 2 on the heat sink 1, preferably before treating the body 10 of the heat sink 1. More specifically, the laser treatment can be applied to a face distinct from a face on which the printed circuit 3 and/or the electronic component 2 is mounted. Alternatively or additionally, and notably depending on the size of the laser beam, the laser treatment can be applied on the same face, at a location distinct from the position of the printed circuit 3.

The laser treatment is carried out without any risk to the printed circuit or the components or a glue joint.

Moreover, generally, a coverage of at least 60% combined with one of the laser pulses of less than 20 ns, allows improved treatment of the surface, more specifically to acquire the structure of nodules.

In order to scan the laser beam 5 on the surface 100*a* of the body 10, the laser beam 5 can be focused and then scanned using suitable equipment. The laser treatment is suitable for treating difficult to access zones, such as cavities, folds formed by a complex shape of the body 10. Therefore, the laser treatment can be carried out on parts with complex geometries. According to one example, the laser beam can be transmitted by a galvanometric head 52, equipped with two mirrors allowing the laser beam to be oriented along x and along y, as illustrated in FIGS. 5 and 6.

In order to enable the laser treatment, it is nevertheless understood that an optical path must be possible to emit the laser beam 5 on the surface 100*a*. This can optionally limit the number of fins that can be disposed and treated on a heat sink. However, the increase in the dissipating power of the heat sink can compensate for this reduction in the number of fins, which also allowed the weight of the heat sink to be limited.

Preferably, the depth of field $P_5$ of the laser beam 5 is substantially equal to 3 mm. Thus, the laser treatment can accommodate height differences on the surface 100*a*, for example, reliefs, in a range of +/−1.5 mm. Furthermore, the method can include an adjustment of the distance $D_5$ between the emission of the laser and the surface 100*a*, in order to improve the tolerance of the steps of the surface 100*a*. The distance D5 can, for example, substantially range between 10 cm and 50 cm, and preferably substantially can be equal to 20 cm. The distance D5 also can be greater than the indicated range, for example, when an optical fiber laser is used.

The laser beam 5 is scanned on the surface 100*a* with a coverage rate that is substantially greater than or equal to 60%. The term "coverage rate" is understood to mean the coverage surface between two or more impact zones 51. The pulses may or may not be successive. According to the example illustrated in FIG. 6, it is understood that this coverage extends in the (x, y) plane of the surface 100*a*. Thus, this coverage rate can be acquired when only scanning the laser beam 5 along x, or by combining two or more scans of the laser beam 5 along x, with two scans being separated by a distance Δy. These scans may or may not be successive. Indeed, it has been observed during the development of the invention that the time between the laser pulses had little or even no effect on the acquired features. Preferably, the coverage rate is substantially greater than or equal to 70%, and even more preferably is substantially equal to 75%. The greater the coverage rate, the more the scanning speed of the beam decreases. A coverage rate of 75% represents a good compromise between the laser treatment speed and the improvement of the emissive properties of the heat sink 1. The laser treatment can have, for example, a processing speed that is substantially greater than 300 $mm^2 \cdot s^{-1}$.

The processing speed V (in $mm^2 \cdot s^{-1}$) can be provided, for example, by the following expression:

$$V = \left\{ \frac{Pmoy}{D_p \times t_p \times \pi \left( \frac{d}{2} \right)^2} \right\} \times (d \times (1 - \tau))^2 \qquad \text{[Equation 1]}$$

With Pav being the average power of the laser, $D_p$ being the power density, $t_p$ being the duration of a laser pulse, d being the diameter of the impact zone and T being the coverage rate. The portion of the above expression between curly brackets corresponds to the laser firing frequency in Hz.

The size of the laser beam 5 at the impact zone 51 can be selected so that the laser treatment is applied in well-defined zones, in narrow zones, or even on large surfaces. The diameter $D_{51}$ of the impact zone 51 can be selected over a range of values ranging from a few tens of μm to several cm, preferably from a few tens of μm to several hundred μm, this value will be selected as a function of the size of the zone to be treated. According to one example, the diameter $D_{51}$ is substantially less than 500 μm, preferably 400 μm, and even more preferably 100 μm. Thus, specific and/or complex patterns can be produced by the laser treatment, with a resolution of up to a few tens of μm. It is thus possible to create localized paths and zones for improved heat dissipation on the heat sink 1.

The wavelength of the laser beam 5 can be selected in the infrared, in the visible, or in the ultraviolet domain. Shifting the wavelengths toward high energies promotes interactions with the surface 100*a* and the efficiency of its oxidation in order to form the surface layer 100.

The laser treatment can be carried out under ambient air, facilitating its implementation. The cost of the resulting method and heat sink is therefore reduced. In addition, large parts can be treated without requiring a reactor for conveying gases. Alternatively, the laser treatment can be carried out under a reactive atmosphere, and more specifically under an oxidizing atmosphere in order to improve the process of creating the surface layer 102 of oxide. The oxidizing atmosphere notably can have a proportion of an oxidizing gas, for example, dioxygen, of more than 20%.

It should be noted that the method can include any step configured to acquire one of the described features of the heat sink. The heat sink can also have any feature resulting from the implementation of a step of the method.

A particular example of the manufacturing method will now be described, in which the laser is a Q-Switched Nd:YAG (1064 nm wavelength) laser, generating pulses for which:

$t_p$ is equal to 10 ns;
Pav is equal to 40 W;
$D_p$ is equal to 100 $MW/cm^2$;
the impact zone is circular with a diameter d of 400 □ m;
the coverage rate T is 75%;
the depth of field is 3 mm;
the laser firing frequency is approximately 32 kHz;
the treatment speed V is 318 $mm^2 \cdot s^{-1}$.

Figure 7:
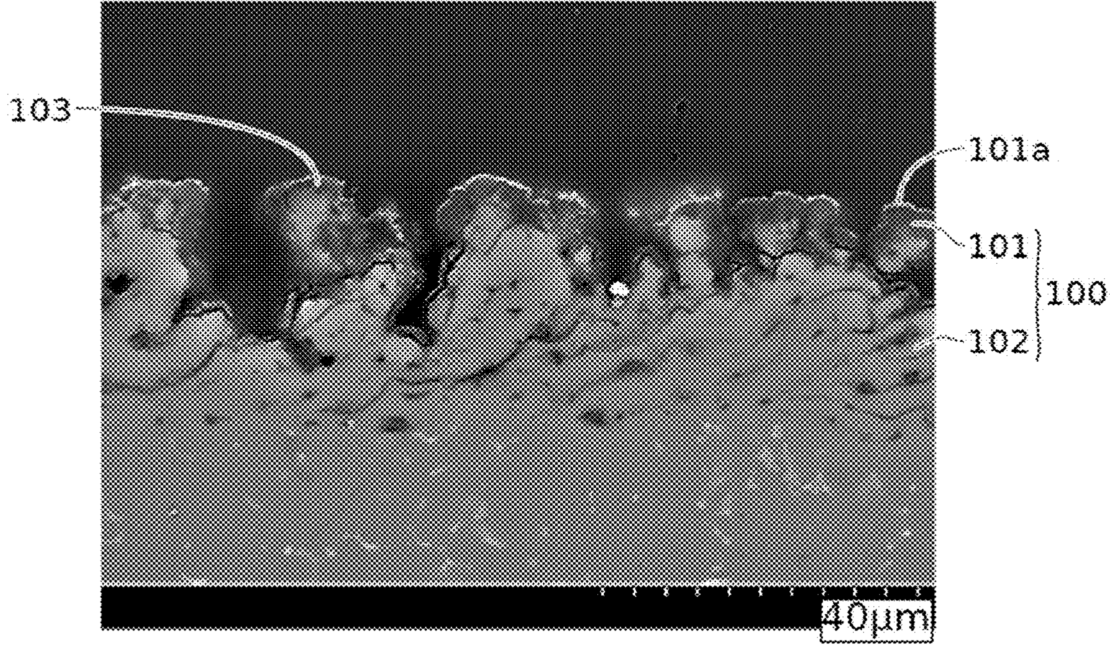
FIG. 7 shows a cross-sectional view of scanning electron microscopy of the upper layer of the body of the heat sink, acquired after the pulsed laser treatment, according to one embodiment.
Figure 8:
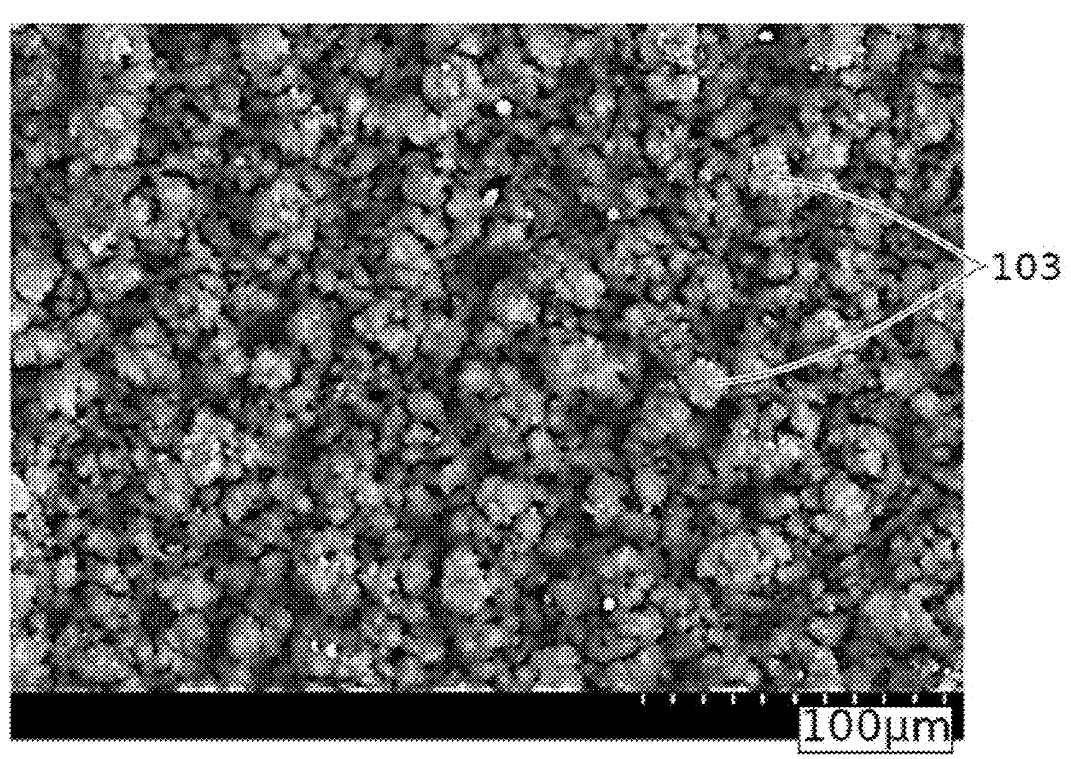
FIG. 8 shows a top view of scanning electron microscopy of the upper layer of the body of the heat sink, acquired after the pulsed laser treatment, according to the example illustrated in FIG. 7.

The surface that is acquired is illustrated by the scanning electron microscopy images in FIGS. 7 and 8, and clearly has the features described above.

A simulation has also been carried out between an untreated heat sink, and a heat sink with the same structure and with the features of the structure described above, following a laser treatment. The two heat sinks are mounted with an LED: NC2W321BT-M700 operating at a power of 4.12 W, in an unconfined environment, at an ambient temperature of 25° C. The untreated heat sink exhibits emissivity of 0.08, while the emissivity of the heat sink according to the invention exhibits emissivity of 0.7. An increase of the dissipating power of the heat sink by a factor of 8.75 is thus provided by means of the laser treatment. These simulations have been completed with emissivity measurements on samples.

In general, according to the invention, the method according to the invention allows the surface layer to be produced so that it has a porosity rate by volume of less than 4%. This allows better radiative properties by absorption and by emission to be provided.

In light of the above description, it is clear that the invention proposes an improved heat sink and an improved method for manufacturing a heat sink compared to the existing solutions.

The invention is not limited to the embodiments described above and extends to all the embodiments covered by the invention. The present invention is not limited to the examples described above. Many other alternative embodiments are possible, for example, by combining features described above, without departing from the scope of the invention. Furthermore, the features described with respect to one aspect of the invention can be combined with another aspect of the invention.

LIST OF NUMERICAL REFERENCES

1 Heat sink
10 Body
100 Outer layer
100*a* Surface of the outer layer
100*b* Residual compounds
101 Surface layer
101*a* Surface of the surface layer
102 Underlying layer
103 Nodule
11 Fin
2 Electronic component
20 Light-emitting diode
3 Printed circuit
30 Thermal interface
4 Device
40 Reflector
5 Laser beam
50 Beam orientation
51 Impact zone

The invention claimed is:

1. A heat sink for an electronic component comprising:

a body provided with an outer layer, comprising a surface layer having a radiative exposed surface and a layer immediately underlying the surface layer, wherein:

the underlying layer is made of a material made of a metal or of a metal alloy and the surface layer is made of an oxide of said material;

the outer layer comprises juxtaposed nodules which are separated by an inter-nodular zone; and a shape of the nodules is generally cylindrical.

2. The heat sink as claimed in claim 1, wherein the metal is selected from among magnesium, iron, steel, copper and aluminum.

3. The heat sink as claimed in claim 2, wherein the metal is aluminum and the oxide is alumina.

4. The heat sink as claimed in claim 1, wherein the surface layer has an average thickness that is greater than or equal to 5 μm.

5. The heat sink as claimed claim 1, wherein the surface layer has an average thickness ranging between 5 μm and 30 μm.

6. The heat sink as claimed claim 1, wherein the surface layer has a porosity rate by volume of less than 4%.

7. The heat sink as claimed in claim 1, wherein each nodule has a variable cross-sectional shape over a height of this nodule.

8. The heat sink as claimed in claim 1, wherein the nodules on average have:

a first dimension in a direction parallel to a main extension plane of the outer layer that is less than or equal to 50 μm;

a second dimension in a direction normal to the main extension plane of the outer layer that is less than or equal to 50 μm.

9. The heat sink as claimed in claim 1, wherein the nodules are spaced apart from each other by an average distance, in a direction parallel to a main extension plane of the outer layer, that is less than or equal to 50 μm.

10. The heat sink as claimed in claim 1, wherein the nodules are formed by a combination of the surface layer and of at least a portion of the underlying layer.

11. The heat sink as claimed in claim 2, wherein the surface layer has an average thickness that is greater than or equal to 5 μm.

12. The heat sink as claimed claim 2, wherein the surface layer has an average thickness ranging between 5 μm and 30 μm.

13. The heat sink as claimed in claim 9, wherein the average distance is approximately 10 μm to approximately 50 μm.

* * * * *